June 11, 1935.  L. M. MERCIER  2,004,822

PRESSURE CONTROL FOR PNEUMATIC TIRES

Filed Dec. 15, 1932

Inventor:
Louis Marcel Mercier
Attorney:

Patented June 11, 1935

2,004,822

UNITED STATES PATENT OFFICE 2,004,822

PRESSURE CONTROL FOR PNEUMATIC TIRES

Louis Marcel Mercier, Neuilly-sur-Seine, France

Application December 15, 1932, Serial No. 647,445
In Belgium October 27, 1932

1 Claim. (Cl. 152—11.5)

The present invention relates to pressure controls for pneumatic tires.

One of the objects of the present invention is to provide a compact assembly which may be permanently attached to, or formed integrally with, the valve of a pneumatic tire and which prevents the air pressure inside the tire from exceeding a predetermined value.

Other objects will appear in the course of the detailed description now to be given with reference to the accompanying drawing, in which.

Figure 1:
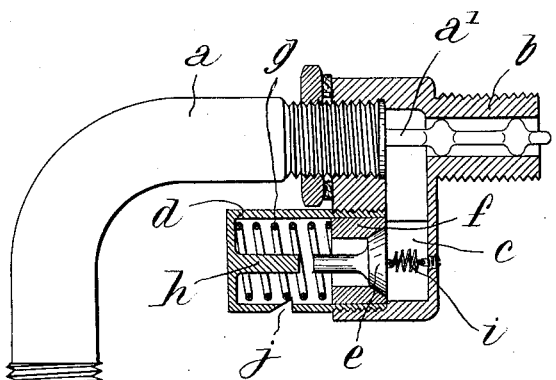
Fig. 1 is an axial section through one illustrative embodiment of the invention.
Figure 2:
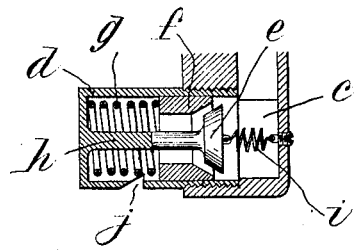
Fig. 2 represents the device shown in Fig. 1, during a different phase in the operation thereof.

Referring to Figs. 1 and 2 of the drawing, there is shown an assembly composed of the following elements. A tubular stem $a$ (straight or bent) such as is usually attached to inner tubes; a casing $b$ threadedly engaging with element $a$; a valve rod $a^1$ forming part of the usual type of valve coacting with tube $a$; a cylinder $d$ threadedly engaging with casing $t$ at one extremity; a valve $e$ provided with a bevelled peripheral seat; a hollow piston $f$ slidably contacting with cylinder $d$ and provided with a bevelled seat adapted to coact with valve $e$; a spring $g$ opposing movement of piston $f$; an abutment $h$ integral with the bottom of cylinder $d$; a spring $i$ adapted to center valve $e$ when the latter is out of contact with piston $f$; and a bevelled passage $j$ adapted to function as a whistle.

The hereinabove described assembly operates as follows when an air supply nozzle is applied to the open end of casing $b$, valve rod $a^1$ will move inward and unseat the valve attached thereto; air will then pass into the inner tube in the usual way; but when the pressure inside the latter reaches a predetermined value fixed by spring $g$, the air in chamber $c$ will react on piston $f$ so as to move the latter out of engagement with valve $e$ (Fig. 2), abutment $h$ serving to arrest said valve, while spring $i$ acts to maintain the same in centred position; air will then escape through the interspace between elements $e$ and $f$ and, in passing through orifice $j$, will produce a warning sound.

Figure 3:
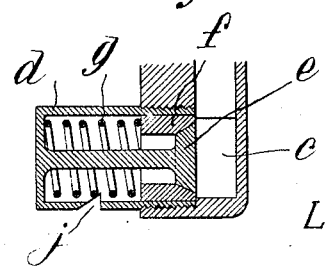
Fig. 3 shows, in section, a second form of the invention.

The variant shown in Fig. 3 differs from the device above described only in the design of element $e$ and $h$ which are, here, made integral with one another, valve $e$ being then immovable and spring $i$ being eliminated. This form of device operates substantially in the same manner as the one shown in Figs. 1 and 2, except that piston $f$ alone responds to pressure.

From the foregoing, it will be seen that each tire will be equipped to prevent pressures in the inner tube exceeding a predetermined value fixed by spring $g$ and that no pressure gauge or equivalent need be used when inflating a tire.

What I claim is:—

A safety valve for use in connection with a pneumatic tire valve device including a valve stem, a vale in said stem and a valve rod projecting from said valve stem, which comprises, in combination, a casing having a screw threaded bore for connecting it to the inlet end of said valve stem, a tubular air inlet extension carried by said casing and adapted to receive slidably the end of said valve rod, a cylinder opening at one end into said casing and rigidly fixed thereto, said cylinder being provided with a hole in its intermediate wall so as to connect its inside with the atmosphere, a piston slidably mounted in said cylinder provided with an opening extending therethrough, a valve mounted in said opening, elastic means adapted to act on said piston for resisting the action of the air pressure in said casing thereon, and an abutment rigidly carried by said cylinder and mounted to contact with said valve when the piston has moved a predetermined distance in the cylinder under the action of the air pressure in the casing.

LOUIS MARCEL MERCIER.